(12) United States Patent
Qian

(10) Patent No.: US 9,291,348 B2
(45) Date of Patent: Mar. 22, 2016

(54) FLUE GAS REHEATER

(71) Applicant: SHANGHAI FUBO EP EQUIPMENT CO., LTD., Shanghai (CN)

(72) Inventor: Xuelue Qian, Shanghai (CN)

(73) Assignee: SHANGHAI FUBO EP EQUIPMENT CO., LTD., Shanghai (CN)

( * ) Notice: Subject to any disclaimer, the term of this patent is extended or adjusted under 35 U.S.C. 154(b) by 0 days.

(21) Appl. No.: 14/669,010

(22) Filed: Mar. 26, 2015

(65) Prior Publication Data

US 2015/0198330 A1 Jul. 16, 2015

Related U.S. Application Data

(63) Continuation-in-part of application No. PCT/CN2013/072586, filed on Mar. 14, 2013.

(30) Foreign Application Priority Data

Sep. 26, 2012 (CN) .......................... 2012 1 0364365
Sep. 26, 2012 (CN) ....................... 2012 2 0497055 U

(51) Int. Cl.
| F23J 15/02 | (2006.01) |
| F23J 15/06 | (2006.01) |
| F23J 15/08 | (2006.01) |
| F28F 27/00 | (2006.01) |

(52) U.S. Cl.
CPC *F23J 15/06* (2013.01); *F23J 15/08* (2013.01); *F28F 27/00* (2013.01)

(58) Field of Classification Search
CPC .................... F23J 2215/20; F23J 2900/15081; C10K 1/004; C10K 1/26
USPC ................................... 122/4 D; 110/345, 347
See application file for complete search history.

(56) References Cited

U.S. PATENT DOCUMENTS

| 4,649,034 A * | 3/1987 | Rutledge .............. B01D 53/508 110/343 |
| 5,282,429 A * | 2/1994 | Kato ........................ B03C 3/01 110/215 |
| 5,509,461 A * | 4/1996 | Williams ............... F23J 15/006 110/215 |

* cited by examiner

*Primary Examiner* — Gregory A Wilson
(74) *Attorney, Agent, or Firm* — Matthias Scholl P.C.; Matthias Scholl

(57) ABSTRACT

A flue gas reheater, including: a heat absorption section; a first heat release section; a second heat release section; a control system; circulation pipes; a flow control valve; and temperature sensors. The first heat release section and the second heat release section are connected to the heat absorption section via the circulation pipes. A heat transfer medium is disposed inside the circulation pipes. The circulation pipes include ascending pipes and descending pipes connecting the heat absorption section to the first heat release section and the second heat release section. The flow control valve is disposed on a condensate pipeline entering the second heat release section. The temperature sensors are disposed in the first heat release section and the heat absorption section. The flow control valve and the temperature sensors are all connected to the control system.

5 Claims, 2 Drawing Sheets

FLUE GAS REHEATER

CROSS-REFERENCE TO RELATED APPLICATIONS

This application is a continuation-in-part of International Patent Application No. PCT/CN2013/072586 with an international filing date of Mar. 14, 2013, designating the United States, now pending, and further claims priority benefits to Chinese Patent Application No. 201220497055.4 filed Sep. 26, 2012, and to Chinese Patent Application No. 201210364365.3 filed Sep. 26, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to a natural circulation indirect type flue gas reheater.

2. Description of the Related Art

As the flue gas from a boiler contains sulfur dioxide, direct discharge thereof tends to produce acid precipitation, causing serious environmental pollution. Limestone (or lime)-gypsum wet desulfurization has been widely used for desulfurization of the flue gas. The limestone (or lime)-gypsum wet desulfurization system often includes a gas-gas heat exchanger (GGH).

The work flow chart of the GGH is shown in FIG. 1. The flue gas prior to entering the desulfurization tower 1 directly exchanges heat with the purified flue gas discharged out of the desulfurization tower via a rotary heat exchanger 4, and the purified flue gas after heat absorption enters the chimney 5. The high temperature section 2 of the flue and the low temperature section 3 (transporting purified flue gas) of the flue are vertically arranged in parallel. In the operation process of the conventional GGH, limited by the structure of the rotary heat exchanger, the sealing performance thereof is not good, so that leakage easily happens, sulfur dioxide escapes during the operation process, the efficiency of desulfurization decreases, even the emission cannot meet the standard. The structure of the rotary heat exchanger is illustrated in FIG. 2. In another aspect, sulfur dioxide contained in the flue gas, as described above, contacts with the water vapor of the flue gas to produce sulfuric acid when the temperature of the flue gas is lower than a certain degree, thereby causing corrosion on the device. Furthermore, after the installation of the GGH, the corrosion on the elements of the GGH and the blockage of the heat exchanger elements decrease the availability of the wet desulfurization system and improve the maintenance cost for the GGH.

Low-temperature electrostatic precipitator (ESP) technology has solved problems of the wet chimney after the desulfurization to a certain degree. Working process of the technology includes adopting a heating medium (generally the water medium) to exchange heat with the flue gas via the heat recovery device and the reheater so as to decrease the operating temperature of the water medium entering the ESP from a normal low temperature state (130-140° C.) to a much lower temperature state (90-100° C.) and increase the temperature of the flue gas after desulfurization from 50° C. to 90° C., thereby utilizing the waste heat of the flue gas and decreasing the energy consumption, improving the dust removal and desulfurization efficiencies, saving the water for desulfurization, and alleviating corrosion on the downstream devices of the ESP. However, the heat medium adopted in the technology requires a heating pump to transport, which results in much increase of the operation cost.

Also, there is an evaporating cooling flue gas reheater for substituting the conventional GGH. In the flue gas reheater, a primary flue gas heat exchanger and a purified flue gas heat exchanger are connected via a vapor chamber, and a vacuum pump is used to control pressures in the heat exchangers to regulate the wall temperature. However, because the primary flue gas heat exchanger is directly connected with the purified flue gas heat exchanger via the vapor chamber, the circulation of the medium cannot go on smoothly. In addition, the wall temperature is controlled using the vacuum pump, during the practical application process, the pressure measurement by the pressure sensor is often inaccurate, so that the control system cannot work effectively, resulting in unstable operation of the whole system.

SUMMARY OF THE INVENTION

In view of the above existing problems in the prior art, it is one objective of the invention to provide a natural circulation indirect type flue gas reheater that is adapted to prevent acid dew corrosion and heat the purified flue gas after desulfurization on the basis of not affecting the desulfurization efficiency and involving no additional dynamic devices.

To achieve the above objective, in accordance with one embodiment of the invention, there is provided a flue gas reheater for use in a flue, the flue comprising a high temperature section and a low temperature section which are divided by a desulfurization tower. The flue gas reheater comprises: a heat absorption section; a first heat release section; a second heat release section; a control system; circulation pipes; a flow control valve; and temperature sensors. The heat absorption section is disposed in a high temperature section of a flue in front of a desulfurization tower. The first heat release section is disposed inside a low temperature section of the flue behind the desulfurization tower. The second heat release section is disposed outside the flue for heating a condensate. The control system is also disposed outside the flue. The first heat release section and the second heat release section are connected to the heat absorption section via the circulation pipes; a heat transfer medium is disposed inside the circulation pipes. The circulation pipes comprise ascending pipes and descending pipes connecting the heat absorption section to the first heat release section and the second heat release section; both the ascending pipes and the descending pipes are disposed outside the flue. The flow control valve is disposed on a condensate pipeline entering the second heat release section. The temperature sensors are disposed in the first heat release section and the heat absorption section. The flow control valve and the temperature sensors are all connected to the control system.

In a class of this embodiment, the heat transfer medium is deoxygenated water.

In a class of this embodiment, the second heat release section, the first heat release section, and the heat absorption section are disposed top-down in a vertical direction.

In a class of this embodiment, the high temperature section and the low temperature section of the flue are disposed in parallel in a horizontal direction.

In a class of this embodiment, a wall temperature of the heat absorption section is at most 20° C. lower than an acid dew point.

As described in the above, the natural circulation indirect type flue gas reheater of the invention has the following advantages: different from the conventional GGH that directly exchanges heat between the flue gas before desulfurization and the purified flue gas after desulfurization to heat the purified flue gas after desulfurization, the flue gas reheater of the invention utilizes heat quantity recovered from the flue gas before desulfurization to indirectly heat the purified flue gas after desulfurization, so that problems of corrosion and leakage existing in the conventional GGH systems are solved and the instability of the conventional GGH systems is solved. Meanwhile, the waste heat of the flue gas is deeply recovered, the temperature of the flue gas at the inlet of the desulfurization tower is decreased, and the energy-saving water-saving effect of the desulfurization system is realized. Different from the low temperature ESP technology, the heat transfer medium in the present indirect flue gas reheater naturally circulates, thus, the indirect heat exchange between the high temperature flue gas and the low temperature flue gas can be realized in the absence of additional dynamic devices, and the control system is reasonable and effective. Signals transmitted from the temperature sensors are utilized by the control system of the invention to control the flow rate of the condensate entering the second heat release section so as to control the wall temperature of the heat absorption section and the temperature of the flue gas at the outlet of the first heat release section, so that not only are the wall temperature and the flue gas temperature controlled, but also the surplus heat quantity is effectively recovered and utilized.

Figure 1:
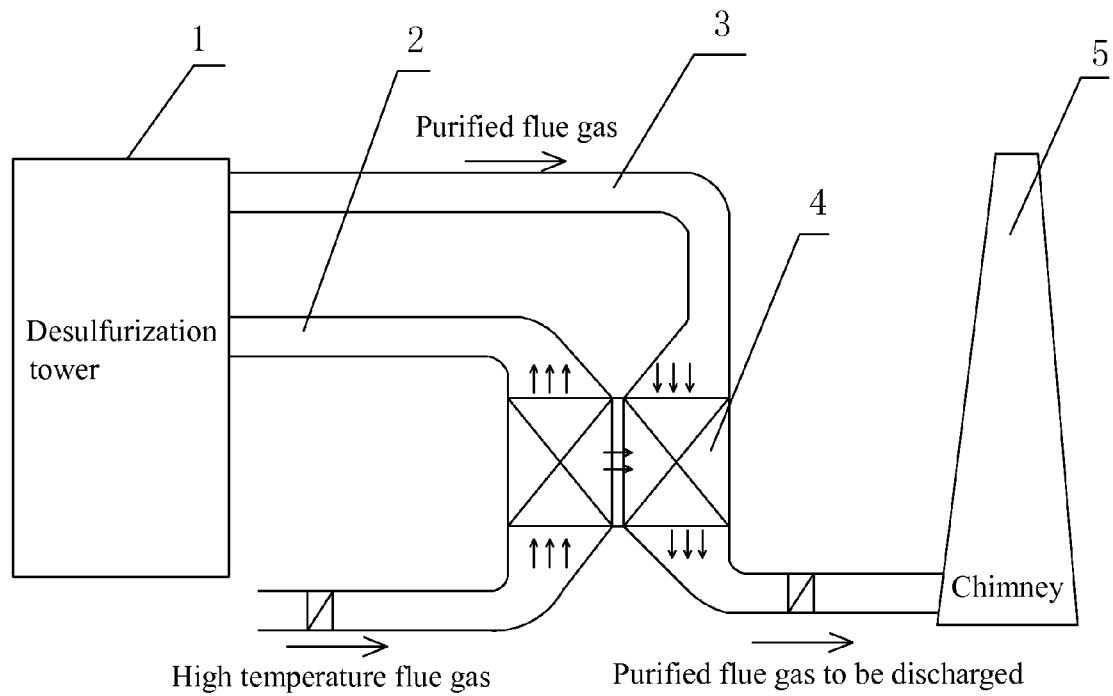
FIG. 1 is a flow chart of a conventional GGH.
Figure 2:
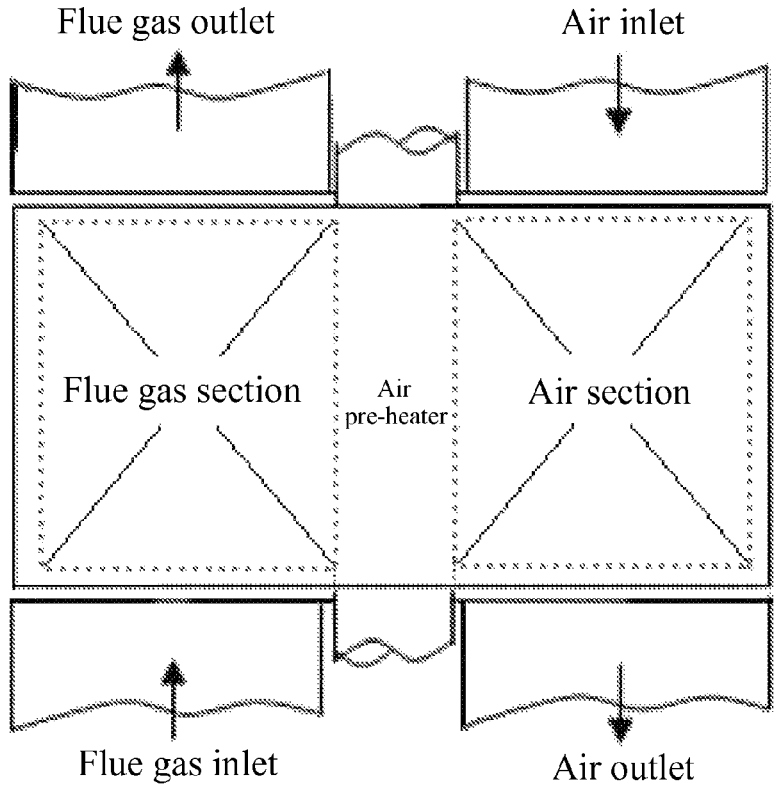
FIG. 2 is a structure diagram of a rotary heat exchanger.

In the drawings, the following reference numbers are used: 1. Desulfurization tower; 2. High temperature section flue; 3. Low temperature section of flue; 4. Rotary heat exchanger; 5. Chimney; 6. Heat absorption section; 7. First heat release section; 8. Second heat release section; 9, 10. Circulation pipes; 11. Flow control valve; 12. Control system; 13. Condensate pipeline; and 14. Temperature sensor.

DETAILED DESCRIPTION OF THE EMBODIMENTS

The technical scheme of the invention is described in detail hereinbelow combined with specific modes for carrying out of the invention, and persons skilled in the art are able to know other advantages and effects from the contents disclosed in the specification.

Accompanying drawings are FIGS. 1-4. It should be noted that structures, proportions, sizes depicted in the accompanying drawings of the invention are all utilized to match with the contents revealed in the specification and to make persons skilled in the art better understanding and reading but not to limit the spirit of the invention, and thereby being of no essential technical significance. Any modifications of the structures, changes of the proportional relations, or adjustment of the sizes fall within the range of the technical description revealed by the invention on condition that the technical effect and the purpose of the invention are not affected. Meanwhile, terms such as "up", "down", "right", "left", "middle", and "a" are used in the specification only for better understanding of the description rather than limiting the scope of the implementation of the invention. The change or adjustment of relative position relations should be deemed to fall within the scope of the implementation of the technical contents revealed in the invention on the premise of no essential change of the technical contents.

Figure 3:
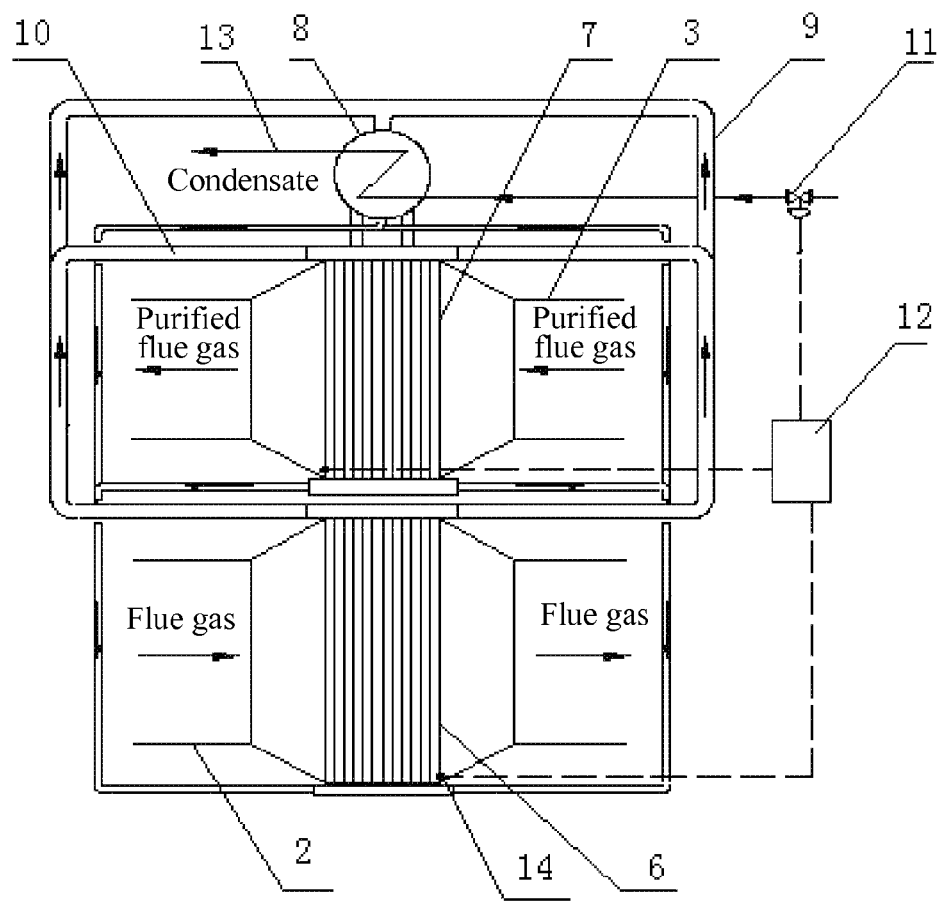
FIG. 3 is a structure diagram of a natural circulation indirect type flue gas reheater.
Figure 4:
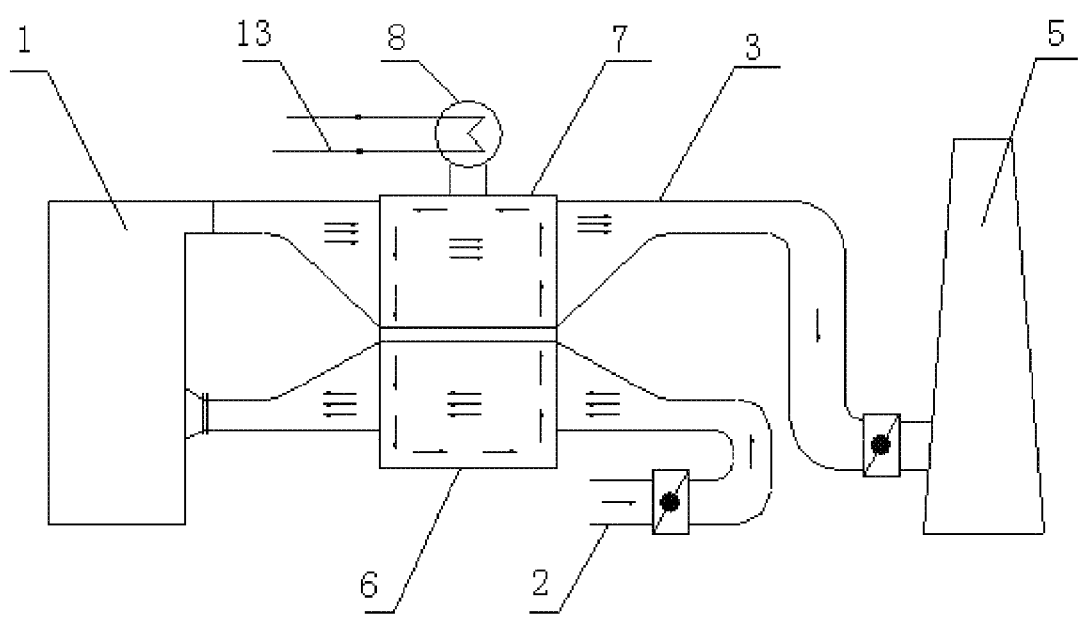
FIG. 4 is a flow chart of a natural circulation indirect type flue gas reheater.

As shown in FIGS. 3-4, a natural circulation indirect type flue gas reheater is provided. The flue gas reheater comprises: a heat absorption section 6 and a first heat release section 7 disposed in a flue, a second heat release section 8 disposed outside the flue for heating a condensate, and a control system 12. The heat absorption section 6 is disposed in a high temperature section of a flue 2 in front of a desulfurization tower. The first heat release section 7 is disposed inside a low temperature section 3 of the flue behind the desulfurization tower. The first heat release section 7 and the second heat release section 8 are connected to the heat absorption section 6 via circulation pipes 9, 10. A heat transfer medium is disposed inside the circulation pipes 9, 10. The circulation pipes 9, 10 comprise ascending pipes connecting the heat absorption section 6 with the first heat release section 7 and the second heat release section 8, and descending pipes connecting the heat absorption section 6 with the first heat release section 7 and the second heat release section 8. Both the ascending pipes and the descending pipes are disposed outside the flue. A flow control valve 11 is disposed on a condensate pipeline 13 entering the second heat release section. Both the first heat release section 7 and the heat absorption section 6 are provided with temperature sensors 14. The flow control valve 11 and the temperature sensors 14 are all connected to the control system 12. The natural circulation indirect type flue gas reheater of the invention utilizes the waste heat of the flue gas before desulfurization to indirectly heat the purified flue gas after desulfurization so as to prevent problems such as smoke-rain downwash and white smoke caused by too low temperature of the flue gas after desulfurization and to effectively decrease the temperature of the flue gas entering the desulfurization tower thereby reaching the energy-saving water-saving effect of the desulfurization tower. Meanwhile, the heat absorption section and heat release section are directly connected via circulation pipes where heat transfer medium automatically circulates, so that no additional dynamic device is needed. Furthermore, the heat release quantity of the second heat release section regulated by the control system to further regulate the heat absorption of the heat absorption section, therefore, the devices is prevented from the acid dew corrosion, and the application of the control system ensures more accurate control of the temperature of the flue gas entering the desulfurization tower. Not only are purposes of controlling the wall temperature and the flue gas temperature realized, but also the surplus heat quantity is effectively recovered and controlled.

The above condensate pipeline can be a condensate transporting pipeline of a water supply system of a boiler. Thus, the above control system 12 achieves the purpose for controlling the wall temperature and the flue gas temperature by regulating the heat release of the second heat release section 8. The second heat release section 8 absorbs a part of heat quantity during the control process, such part of heat quantity is used to heat the condensate and increase the temperature of the boiler, so that the heat quantity is effectively utilized.

For better realizing the self-circulation of the heat transfer medium in the circulation pipe, as shown in FIG. 4, the high temperature section 2 of the flue in front of the desulfurization tower 1 and the low temperature section 3 of the flue behind the desulfurization tower are arranged in parallel in the horizontal direction, which enables the second heat release section 8, the first heat release section 7, and the heat absorption section 6 to be arrange top-down in the vertical direction. Such arrangement in the vertical direction better satisfies that the circulation of the heat transfer medium is realized under the self-gravity effect. Preferably, the heat transfer medium is deoxygenated water.

The circulation pipes 9, 10 comprise ascending pipes connecting the heat absorption section 6 with the first heat release section 7 and the second heat release section 8, and descending pipes connecting the heat absorption section 6 with the first heat release section 7 and the second heat release section 8.

Compared with the conventional GGH technology, the flue gas reheater of the invention has the following advantages: first, the invention focus on recovering the waste heat of the flue gas before desulfurization to indirectly heat the purified flue gas after desulfurization, so that problems such as leakage and corrosion existing in the conventional GGH technology is avoided. Second, from further study on the corrosion of the low temperature acid dew, the wall temperature of the indirect flue gas reheater of the invention is allowed to be decreased to a temperature level much lower than the acid dew point of the flue gas. Furthermore, if the conventional GGH technology is adopted, the temperature of the flue gas in the desulfurization tower is generally maintained above the acid dew point, however, if the technology provided by the invention is utilized, the wall temperature of a rear end of the indirect flue gas reheater is strictly controlled at 20° C. lower than the acid dew point, that is, within the commonly called the first safety region, which means that at least an amount of the low temperature waste heat corresponding to the 20° C. temperature drop of the flue gas can be adopted by people. Third, the temperature of the flue gas entering the desulfurization tower after the indirect flue gas heat exchange is further decreased, so that the energy-saving water-saving effect of the desulfurization system is realized.

Working principle of the natural circulation indirect type flue gas reheater of the invention is as follows:

The flue gas having a relatively high temperature is discharged from a dust collector, passes through the high temperature section 2 of the flue and enters the heat absorption section 6 of the indirect type flue gas reheater where a part of the heat quantity is released. The flue gas then in introduced into the desulfurization tower 1. After reaction in the desulfurization tower 1, the purified flue gas passes through the low temperature section 3 of the flue and enters the first heat release section 7 where the purified flue gas is heated. Thereafter, the heated purified flue gas enters the chimney 5 and is discharged out of the chimney 5.

When the flue gas is introduced to the heat absorption section 6 and the first heat release section 7 of the indirect flue gas reheater, the indirect type heat exchange of the indirect flue gas reheater is characterized in non-leakage compared with the direct heat exchange of the rotary heat exchanger. Besides, the wall temperature of the indirect type flue gas reheater of the invention is able to keep constant, and only a relatively small gradient temperature drop exists between the wall temperature and the flue gas temperature. When the wall temperature of the heat absorption section of the indirect flue gas reheater is higher than 20° C. below the acid dew point temperature (the first safety region), the temperature of the discharged flue gas is only approximately 15° C. higher than the wall temperature of the heat absorption section of the indirect type flue gas reheater. Meanwhile, when the purified flue gas after desulfurization passes through the heat release section of the indirect type flue gas reheater, the wall temperature thereof also remains constant.

When passing through the heat absorption section 6, the flue gas transfers the heat quantity to the heat transfer medium in the heat absorption section. The heat transfer medium is generally the deoxygenated water. Under the action of lifting forces produced by density differences, the heat transfer medium after absorbing the heat quantity enters the first heat release section 7 and the second heat release section 8 via the ascending pipes of the circulation pipes 9, 10 and releases the heat in the first heat release section 7 and the second heat release section 8. After that the heat transfer medium returns to the heat absorption section 6 via the descending pipes of the circulation pipes 9, 10. Thus, a circulation is accomplished. Additional external dynamic force is not necessitated in the whole circulation process, and the circulation of the heat transfer medium is natural circulation. In the first heat release section 7, the purified flue gas exits from the desulfurization tower is heated by the heat transfer medium to enter the chimney and is finally discharged smoothly. Temperature sensors 14 are disposed on both the first heat release section 7 and the heat absorption section 6. The temperature sensors 14 transmit signals to the control system 12. When the temperature is lower than a preset value, an open degree of the flow control valve 11 is minimized under the control of the control system 12, thereby decreasing the amount of the condensate entering the second heat release section 8 and increasing the wall temperatures of the first heat release section 7 and the heat absorption section 6. The control system 11 controls the wall temperature to always be a reasonable value and the wall temperature of the heat absorption section to be at most 20° C. lower than the acid dew point temperature, thereby ensuring that the no serious corrosion happens on the wall surface.

The natural circulation indirect type flue gas reheater can be used individually or in a combination.

The natural circulation indirect type flue gas reheater of the invention utilizes the waste heat of the flue gas before desulfurization to indirectly heat the purified flue gas after desulfurization so as to prevent problems such as smoke-rain downwash and white smoke caused by too low the temperature of the flue gas after desulfurization and to effectively decrease the temperature of the flue gas entering the desulfurization tower thereby reaching the energy-saving water-saving effect of the desulfurization tower. Meanwhile, the heat absorption section and heat release section are directly connected via circulation pipes where heat transfer medium automatically circulates, so that no additional dynamic device is needed. Furthermore, the heat release quantity of the second heat release section regulated by the control system to further regulate the heat absorption of the heat absorption section, therefore, the devices is prevented from the acid dew corrosion, and the application of the control system ensures more accurate control of the temperature of the flue gas entering the desulfurization tower. Not only are purposes of controlling the wall temperature and the flue gas temperature realized, but also the surplus heat quantity is effectively recovered and controlled. Thus, the flue gas reheater of the invention effectively overcomes the existing problems in the prior art and has great value for industrial use.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A flue gas reheater for use in a flue, the flue comprising a high temperature section and a low temperature section which are divided by a desulfurization tower, the flue gas reheater comprising:
   a) a heat absorption section;
   b) a first heat release section;
   c) a second heat release section;
   d) a control system;
   e) circulation pipes;
   f) a flow control valve; and
   g) temperature sensors;
   wherein
   the heat absorption section is disposed in the high temperature section of the flue in front of the desulfurization tower;
   the first heat release section is disposed inside the low temperature section of the flue behind the desulfurization tower;
   the second heat release section is disposed outside the flue for heating a condensate, and the control system is also disposed outside the flue;
   the first heat release section and the second heat release section are connected to the heat absorption section via the circulation pipes; a heat transfer medium is disposed inside the circulation pipes;
   the circulation pipes comprise ascending pipes and descending pipes connecting the heat absorption section to the first heat release section and the second heat release section;
   both the ascending pipes and the descending pipes are disposed outside the flue;
   the flow control valve is disposed on a condensate pipeline entering the second heat release section;
   the temperature sensors are disposed in the first heat release section and the heat absorption section; and
   the flow control valve and the temperature sensors are all connected to the control system.

2. The flue gas reheater of claim 1, wherein the heat transfer medium is deoxygenated water.

3. The flue gas reheater of claim 1, wherein the second heat release section, the first heat release section, and the heat absorption section are disposed top-down in a vertical direction.

4. The flue gas reheater of claim 1, wherein the high temperature section and the low temperature section of the flue are disposed in parallel in a horizontal direction.

5. The flue gas reheater of claim 1, wherein a wall temperature of the heat absorption section is at most 20° C. lower than an acid dew point.

* * * * *